(12) United States Patent
Tanaka

(10) Patent No.: US 7,706,287 B2
(45) Date of Patent: Apr. 27, 2010

(54) COMMUNICATION SYSTEM MULTIPLEXER INCLUDED IN THE SYSTEM, LINE PERFORMANCE TEST METHOD AND RECORDING MEDIUM HAVING PROGRAM RECORDED THEREON

(75) Inventor: Masashi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 2060 days.

(21) Appl. No.: 10/442,249

(22) Filed: May 21, 2003

(65) Prior Publication Data

US 2003/0218984 A1 Nov. 27, 2003

(30) Foreign Application Priority Data

May 22, 2002 (JP) ............................. 2002-147080

(51) Int. Cl.
- *G01R 31/08* (2006.01)
- *H04J 3/04* (2006.01)
- *H04L 12/28* (2006.01)
- *H04M 1/24* (2006.01)

(52) U.S. Cl. ..................... 370/241; 370/216; 370/535; 379/27.01; 379/27.03

(58) Field of Classification Search ................. 370/241, 370/242, 244, 247, 248, 252; 379/27.01, 379/27.03, 93.09, 100.05, 29.1, 22; 714/4
See application file for complete search history.

(56) References Cited

U.S. PATENT DOCUMENTS

| | | | |
|---|---|---|---|
| 6,049,553 A | 4/2000 | Stein | |
| 6,108,309 A * | 8/2000 | Cohoe et al. | ................. 370/241 |
| 6,349,130 B1 | 2/2002 | Posthuma et al. | |
| 6,532,216 B1 * | 3/2003 | Tennyson | ................... 370/244 |
| 6,693,992 B2 * | 2/2004 | Jones et al. | ............. 379/22.02 |
| 6,826,261 B2 | 11/2004 | Asano | |
| 6,870,901 B1 * | 3/2005 | Gudmundsson et al. | ........ 379/22 |
| 6,885,730 B1 * | 4/2005 | Bremer | ..................... 379/29.01 |
| 6,889,339 B1 * | 5/2005 | D'Amico et al. | ............... 714/4 |
| 6,996,067 B1 * | 2/2006 | Burke et al. | ................. 370/248 |
| 7,062,549 B1 * | 6/2006 | Miller et al. | ................. 709/223 |
| 7,203,186 B1 * | 4/2007 | Fuller et al. | ................. 370/352 |
| 7,224,672 B2 * | 5/2007 | Arai | ........................... 370/252 |
| 2002/0141443 A1 * | 10/2002 | Christensen et al. | ........ 370/468 |
| 2003/0041237 A1 * | 2/2003 | Mcelroy et al. | ............. 713/151 |

FOREIGN PATENT DOCUMENTS

| | | |
|---|---|---|
| JP | 07-321916 | 12/1995 |
| JP | 10-117363 | 5/1998 |
| JP | 2000-209338 A | 7/2000 |

(Continued)

*Primary Examiner*—Hanh Nguyen
(74) *Attorney, Agent, or Firm*—Foley & Lardner LLP

(57) ABSTRACT

The present invention provides an optimum ADSL line configuration parameter to a subscriber line and improves performance quality of an ADSL line.

An ADSL line performance test portion implements an ADSL performance test before starting ADSL line service operation and grasps a subscriber line state. Test results are stored in a database and are referred to for the sake of maintenance of ADSL line service. In addition, the ADSL line performance test portion operates in a maintenance mode as required and also implements the ADSL line performance test in an ADSL line service operation state so as to constantly hold in the database a current optimum ADSL line configuration parameter for the subscriber line.

14 Claims, 15 Drawing Sheets

FOREIGN PATENT DOCUMENTS

| | | |
|---|---|---|
| JP | 2000-295285 | 10/2000 |
| JP | 2002-141933 | 5/2002 |
| JP | 2002-542726 | 12/2002 |
| WO | WO 00/44154 | 7/2000 |
| WO | WO-00/64132 | 10/2000 |

* cited by examiner

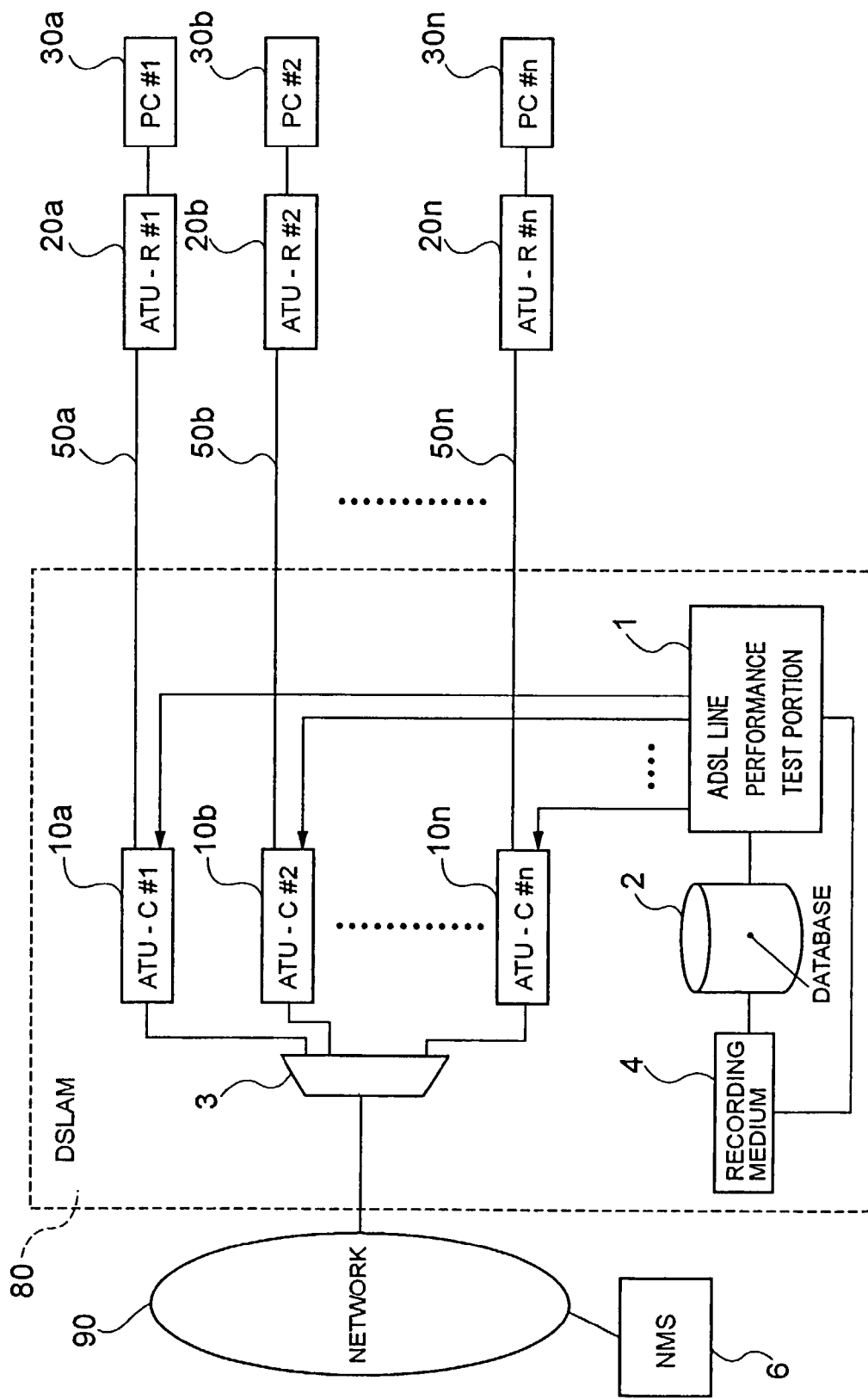

FIG. 9

| SUBSCRIBER ID | | | | | | | | |
|---|---|---|---|---|---|---|---|---|
| ADSL PERFORMANCE RESULTS | UP DIRECTION STREAM | CURRENT ATTENUATION | | | | | | |
| | | CURRENT SNR MARGIN | | | | | | |
| | | ADSL LINE RATE | | | | | | |
| | DOWN DIRECTION STREAM | CURRENT ATTENUATION | | | | | | |
| | | CURRENT SNR MARGIN | | | | | | |
| | | ADSL LINE RATE | | | | | | |
| CONFIGURATION PARAMETER VALUE | UP STREAM DIRECTION | MAXIMUM INTERLEAVE DELAY | | | | | | |
| | | MINIMUM ADSL LINE RATE | | | | | | |
| | | MAXIMUM ADSL LINE RATE | | | | | | |
| | | MINIMUM SNR MARGIN | | | | | | |
| | | MAXIMUM SNR MARGIN | | | | | | |
| | | TARGET SNR MARGIN | | | | | | |
| | DOWN STREAM DIRECTION | MAXIMUM INTERLEAVE DELAY | | | | | | |
| | | MINIMUM ADSL LINE RATE | | | | | | |
| | | MAXIMUM ADSL LINE RATE | | | | | | |
| | | MINIMUM SNR MARGIN | | | | | | |
| | | MAXIMUM SNR MARGIN | | | | | | |
| | | TARGET SNR MARGIN | | | | | | |
| | | MODE | G.dmt DBM | G.dmt FBM | G.lite DBM | G.lite FBM | | |
| | | TEST PROFILE NAME | DEFAULT ADSL LINE CONFIGURATION | | | | | |
| | | PROFILE ID | | | | | | |

FIG. 12

| | | | MODE | G.dmt DBM | G.dmt FBM | G.lite DBM | G.lite FBM | G.dmt DBM | G.dmt FBM | G.lite DBM | G.lite FBM |
|---|---|---|---|---|---|---|---|---|---|---|---|
| ADSL PERFORMANCE RESULTS | UP DIRECTION STREAM | CURRENT ATTENUATION | | | | | | | | | |
| | | CURRENT SNR MARGIN | | | | | | | | | |
| | | ADSL LINE RATE | | | | | | | | | |
| | DOWN DIRECTION STREAM | CURRENT ATTENUATION | | | | | | | | | |
| | | CURRENT SNR MARGIN | | | | | | | | | |
| | | ADSL LINE RATE | | | | | | | | | |
| CONFIGURATION PARAMETER VALUE | UP STREAM DIRECTION | MAXIMUM INTERLEAVE DELAY | | | | | | | | | |
| | | MINIMUM ADSL LINE RATE | | | | | | | | | |
| | | MAXIMUM ADSL LINE RATE | | | | | | | | | |
| | | MINIMUM SNR MARGIN | | | | | | | | | |
| | | MAXIMUM SNR MARGIN | | | | | | | | | |
| | | TARGET SNR MARGIN | | | | | | | | | |
| | DOWN STREAM DIRECTION | MAXIMUM INTERLEAVE DELAY | | | | | | | | | |
| | | MINIMUM ADSL LINE RATE | | | | | | | | | |
| | | MAXIMUM ADSL LINE RATE | | | | | | | | | |
| | | MINIMUM SNR MARGIN | | | | | | | | | |
| | | MAXIMUM SNR MARGIN | | | | | | | | | |
| | | TARGET SNR MARGIN | | | | | | | | | |

| | | | FAST CHANNEL | | | | INTERLEAVE CHANNEL | | | |
|---|---|---|---|---|---|---|---|---|---|---|
| SUBSCRIBER ID | TEST PROFILE NAME | | FAST/INTERLEAVE CHANNELS AND PERFORMANCE | | | | | | | |
| | PROFILE ID | | | | | | | | | |

COMMUNICATION SYSTEM MULTIPLEXER INCLUDED IN THE SYSTEM, LINE PERFORMANCE TEST METHOD AND RECORDING MEDIUM HAVING PROGRAM RECORDED THEREON

BACKGROUND OF THE INVENTION

1. Field of the Invention

The present invention relates to a communication system, and a multiplexer included in the system, a line performance test method and a recording medium having a program recorded thereon, and in particular, to the communication system of an ADSL (Asymmetric Digital Subscriber Line) line, and the multiplexer included in the system, line performance test method and recording medium having a program recorded thereon.

2. Description of the Prior Art

ADSL is a modem technology for allowing high-rate data communication of several Mbps at the maximum by utilizing an existing subscriber line, that is, a telephone line (copper wire) mainly used for a telephone.

The ADSL is standardized as "G. dmt"by the ITU-T recommendation G. 992.1 and as "G. lite" by the ITU-T recommendation G. 992.2. The ADSL is one of the methods of xDSL which is the modem technology, and the xDSL is a generic term for Asymmetric DSL (Digital Subscriber Line), High-bit-rate DSL, Rate-Adaptive DSL, Symmetric DSL and Very-high-bit-rate DSL.

High-speed Internet access by always-on connections becomes possible for a subscriber by using this ADSL line service.

However, the ADSL is characterized in that its performance and data communication rate are influenced by a distance of a subscriber line to be the ADSL line, that is, a telephone line, line characteristics and ambient surrounding conditions of the line from a telephone office to the subscriber's house.

Therefore, the data communication rate of the ADSL line service is different for each of the subscribers. The data communication rate is generally called a line rate or an acquired band of the ADSL line. In the case of the ADSL, the acquired bands are asymmetric between an up stream direction from the subscriber to a network and a down stream direction from the network to the subscriber.

The acquired band is determined by training results standardized by G. dmt and G. lite. As for the ADSL, there are the cases where the ADSL line is cut if the telephone line is influenced by impulse-like noise from the outside. Data transmission is interrupted in this state of the ADSL line.

However, the ADSL line recovers automatically by performing the training again. Representative parameters of ADSL line configuration parameters are an ADSL line rate (normally represented as Mbps), an SNR (Signal to Noise Ratio) margin and an interleave delay.

The SNR margin is the ADSL line configuration parameters for showing a bearing force against the noise from the outside. The SNR margin parameters are further classified into a target SNR margin, a maximum SNR margin and a minimum SNR margin.

The interleave delay is the ADSL line configuration parameter for showing the time required when performing a prescribed error correcting code function by scrambling a data signal flowing on the ADSL line, and it is sometimes utilized as the ADSL line configuration parameter for setting reliability of the data signal which also shows a buffer amount to temporarily store the data signal for the sake of performing the error correcting code function.

The acquired band of the ADSL line, that is, the ADSL line rate is the parameter for showing the line rate determined by the ADSL training according to the SNR, interleave delay and ambient surrounding.

It is also the line configuration parameter for, by inversely specifying the ADSL line rate, rendering a specified value as the ADSL line rate.

The ADSL line configuration parameters of the ADSL line rate, SNR margin and interleave delay are set in both the up stream and the down stream directions of the ADSL line respectively.

There is a correlation among the ADSL line configuration parameters of the ADSL line rate, SNR margin and interleave delay, where the ADSL line rate is reduced if the SNR margin is increased and the ADSL line rate is increased if the SNR margin is reduced.

In addition, the ADSL line rate is reduced if the interleave delay is increased, and the ADSL line rate is increased if the interleave delay is reduced.

Furthermore, in the case where a subscriber line distance is short, that is, the subscriber's house is near the telephone office, the SNR margin can be increased, and in the case where the subscriber line distance is long, that is, the subscriber's house is distant from the telephone office, the SNR margin is reduced so as to link up the ADSL line.

To be more specific, there is a close relationship among the ADSL line rate, subscriber line distance, SNR margin, interleave delay and ambient surrounding, and in the case of providing the ADSL line service, it is necessary to adjust (customize) these parameters.

FIG. 13 is a block diagram of a DSLAM (Digital Subscriber Line Access Multiplexer) in the past for providing such ADSL line service. A DSLAM1000 in the past is comprised of a data signal multiplexing portion 3, an ATU-C (ADSL Termination Unit—Central Office: an office side ADSL modem) #1 100a, an ATU-C #2 100b, an ATU-C #n (n is a positive integer) 100n and an ADSL line initial value setup portion 9.

The data signal multiplexing portion 3 multiplexes data signals received from the ATU-C #1 100a, ATU-C #2 100b and ATU-C #n 100n and sends them to a network 90. The data signal multiplexing portion 3 also sends the data signals received from the network 90 by sorting them into the ATU-C #1 100a, ATU-C #2 100b and ATU-C #n 100n.

The ADSL line initial value setup portion 9 has a preset ADSL line configuration parameter initial value, and sets the parameter to the ATU-C #1 100a, ATU-C #2 100b and ATU-C #n 100n respectively.

At the subscriber's house, an ATU-R (ADSL Termination Unit—Remote: a subscriber side ADSL modem) #1 200a, an ATU-R #2 200b, an ATU-R #n 200n and a PC (personal computer) #1 300a, a PC #2 300b and a PC #n 300n held by the subscribers respectively are installed. The respective PC #1 300a, PC #2 300b and PC #n 300n are connected to the ATU-R #1 200a, ATU-R #2 200b and ATU-R #n 200n respectively.

The respective ATU-C #1 10a, ATU-C #2 100b and ATU-C #n loon in the DSLAM1000 are connected to the respective ATU-R #1 200a, ATU-R #2 200b and ATU-R #n 200n via the respective subscriber lines 500a, 500b and 500n.

The ADSL is a technology for allowing high-rate data communication by utilizing an existing telephone line, and so the respective subscriber lines 500a, 500b and 500n to the subscriber's house are the telephone lines currently in use, which will be the ADSL lines.

The subscribers use their respective PC #1 300a, PC #2 300b and PC #n 300n to connect to the network 90 via the ATU-R #1 200a, ATU-R #2 200b and ATU-R #n 200n, the subscriber lines 500a, 500b and 500n which are now the ADSL lines capable of the high-rate data communication and the DSLAM1000 so as to perform the data communication related to the Internet.

Next, operation of the DSLAM in the past will be described. FIG. 14 is a flowchart showing the operation of the ADSL line setup of the DSLAM in the past (1000 in FIG. 13), that is, a start of the ADSL line service provision.

First, it is determined whether or not preparations for starting the operation have been made (step B1). At first, it is determined that the preparations have not been made because the ADSL line service is in an inoperative state (NO in the step B1). Next, the DSLAM (1000 in FIG. 13) prepares the ADSL line configuration parameter initial value held in advance (step B2). Next, the ADSL line initial value setup portion (9 in FIG. 13) sets the ADSL line configuration parameter initial value to the respective ATU-C #1 100a, ATU-C #2 100b and ATU-C #n loon (step B3).

Here, it means that the ATU-Cs have a common unique ADSL line configuration parameter set up thereon. Then, the ATU-Cs (the ATU-C #1 100a, ATU-C #2 100b and ATU-C #n 100n in FIG. 13) refer to the ADSL line configuration parameter set up in the step B3 to perform the training with the ATU-Rs (the ATU-R #1 200a, ATU-R #2 200b and ATU-R #n 200n in FIG. 13) in compliance with G. dmt or G. lite. As a result of the training, the ADSL lines are linked up (YES in the step B4).

The service allowing high-rate data communication is provided by the linked up ADSL lines (step B5). And if the subscriber is satisfied with the ADSL line state and quality (YES in the step B6), then the ADSL lines will be in a service operation state (step B7).

However, there are the cases where the ADSL lines are not linked up with the ADSL line configuration parameter initial value in the step B2 (NO in the step B4) and the cases where the subscriber may feel dissatisfied such as synchronization of the ADSL lines sometimes being cut and the data communication being interrupted due to the state of the ADSL lines of the subscriber, that is, the rate of the acquired bands and the influence of a noise source halfway on the line to the subscriber's house (NO in the step B6). In such cases, the subscriber files a claim to the ADSL line service provider (step B10).

As opposed to this, the ADSL line service provider determines that the ADSL lines are in the state of starting the operation (YES in the step B1). And the ADSL line service provider examines and adjusts the ADSL line configuration parameter conforming to the lines of the subscriber filing the claim (step B8), and sets up the ADSL line configuration parameter adjusted in the step B8 on the ATU-Cs to which the ADSL lines of the subscriber are connected (step B9).

And the training is performed again (step B4 and B5). If the subscriber is satisfied with the ADSL line state and quality as-is (YES in the step B6), then the ADSL lines will be in the service operation state (step B7). If the subscriber is not satisfied with the ADSL line state and quality as-is (NO in the step B6), then the processing of the steps B1 to B6 is repeated from the step B10.

A first problem of the DSLAM in the past is that, as an optimum ADSL line configuration parameter to each subscriber line is not set up, the lines of inferior quality as the ADSL lines are generated.

The reason for it is that, although each line of the subscriber lines in which the ADSL lines are linked up is influenced by each individual ambient surrounding, the DSLAM adapts the same ADSL line configuration parameter initial value to any subscriber line.

To be more specific, it is because the ADSL line configuration parameter initial value held by the DSLAM is not necessarily the optimum ADSL line configuration parameter for implementing an optimum ADSL line performance of the subscriber line. For this reason, there may occur a state in which the ADSL line of a certain subscriber is so often interrupted that normal data communication cannot be performed.

A second problem is that work by a maintenance worker is necessary to adjust the ADSL line configuration parameter and expenses for the human work arises accordingly.

The reason for it is that the ADSL line configuration parameter needs to be adjusted according to presumption and rules of experience of the maintenance worker of the ADSL line service provider in order to link up the ADSL line and provide a satisfactory ADSL line state and quality to the subscriber.

A third problem is that it takes time to handle the claims from the subscribers.

The reason for it is the same as that for the second problem.

A fourth problem is that maintainability of the ADSL line is inferior because the ADSL line service provider cannot always hold the optimum ADSL line configuration parameter according to the change in the ambient surrounding of the subscriber line.

The reason for it is that the DSLAM holds only the ADSL line configuration parameter initial value as with the first problem and that man-hours arise due to the human work as with the second problem.

Japanese Patent Laid-Open No. 2000-209338 discloses a technology relating to a method of testing a communication link for high-rate services, which is the technology for testing electrical and/or physical properties of the lines. To be more specific, it is the technology for testing a loop length, a line load impedance, a load coil, a frequency characteristic and so on.

As opposed to this, the present invention is the technology for testing the performances of the lines, which is entirely different from the technology described in the above patent laid-open as to all of the object, configuration, action and effects.

Thus, an object of the present invention is to provide a communication system capable of providing the optimum ADSL line configuration parameter to each subscriber line and improving the ADSL line performance quality, a multiplexer included in the system, a line performance test method and a recording medium having program recorded thereon. Another object of the present invention is to realize improvement in working efficiency and reduction in costs of adjustment of the ADSL line configuration parameter for specific subscriber lines.

A further object of the present invention is to be able to immediately handle the claims from the subscribers, subscriber line environment and so on and improve the maintainability, reliability and customer satisfaction of the ADSL line service.

BRIEF SUMMARY OF THE INVENTION

To solve the above described problems, a communication system according to the present invention is characterized by including performance test means for testing a performance of a subscriber line and setting a line configuration parameter to the above described subscriber line based on the above described test results.

In addition, a subscriber line access multiplexer according to the present invention is characterized by including the performance test means for testing the performance of the subscriber line and setting the line configuration parameter to the above described subscriber line based on the above described test results.

In addition, a line performance test method according to the present invention is characterized by including a performance test step of testing the performance of the subscriber line and a line configuration parameter setting step of setting the line configuration parameter to the above described subscriber line based on the above described test results.

In addition, a recording medium having a program recorded thereon according to the present invention is the recording medium having a program for causing a computer to execute the line performance test method recorded thereon, and the program is characterized by including the performance test step of testing the performance of the subscriber line and the line configuration parameter setting step of setting the line configuration parameter to the above described subscriber line based on the above described test results.

According to the present invention, it is possible, by including the above configuration, to provide the optimum ADSL line configuration parameter to each subscriber line and improve the ADSL line performance quality.

A digital subscriber line access multiplexer having the ADSL line test functions shown in the first to fifth embodiments according to the present invention automatically tests the ADSL line performance of each subscriber line.

To be more specific, in the digital subscriber line access multiplexer having the ADSL line test functions, a DSLAM (80 in FIGS. 1, 3 and 4), an NMS (6 in FIG. 6) which is a DSLAM management system and a terminal connected to the NMS (1 in FIG. 5) have a step (a step A50 including the steps A2 to A 6 in FIG. 2) wherein an ADSL line performance test portion (1 in FIGS. 1, 3 and 4, 1 in FIG. 5, and 1 in FIG. 6), the DSLAM (80 in FIGS. 1, 3 and 4), and the NMS (6 in FIG. 6) which is the DSLAM management system or a network management system in general, and the ADSL line performance test portion (1 in FIGS. 1, 3 and 4, 1 in FIG. 5, and 1 in FIG. 6) of the terminal connected to the NMS (1 in FIG. 5) automatically perform an ADSL line performance test.

The digital subscriber line access multiplexer having the ADSL line test functions shown in the first to fifth embodiments according to the present invention stores in a database the ADSL line performance evaluation results of each subscriber line automatically obtained. In addition, it reads the ADSL line performance evaluation results when necessary from the database.

To be more specific, in the digital subscriber line access multiplexer having the ADSL line test functions, the DSLAM (80 in FIGS. 1 and 3) and the NMS (6 in FIGS. 4, 5 and 6) which is a DSLAM management system have the databases (2 in FIGS. 1 and 3 and 2 in FIGS. 4, 5 and 6) respectively, and there are the steps wherein the DSLAM (80 in FIGS. 1, 3 and 4), the NMS (6 in FIG. 5) which is the DSLAM management system and the ADSL line performance test portion (1 in FIGS. 1, 3 and 4, 1 in FIG. 5 and 1 in FIG. 6) of the terminal (1 in FIG. 5) connected to the NMS store the ADSL line performance test results (step A5 in FIG. 2), refer to the ADSL line performance test results (step A13 in FIG. 2) and detect optimum ADSL line setup information (step A14 in FIG. 2).

According to the present invention, the digital subscriber line access multiplexer or the NMS or an external terminal has the ADSL line performance test portion. For this reason, the ADSL line performance test portion automatically obtains the ADSL line performance of each subscriber line, that is, each ADSL line so that it is not necessary to have the ADSL line configuration parameter adjusted and investigated by the human work of the present invention.

The ADSL line performance test portion can freely construct a performance test method for automatically implementing the ADSL line performance.

Furthermore, according to the present invention, the digital subscriber line access multiplexer or the NMS has the database.

For this reason, the database holds result data of the ADSL line performance of each subscriber line, that is, each ADSL line implemented by the ADSL line performance test portion.

Furthermore, the ADSL line performance result data in the database is referred to by the ADSL line performance test portion. Furthermore, optimum ADSL line setup information on the subscriber line in the database is detected by the ADSL line performance test portion.

BRIEF DESCRIPTION OF THE DRAWINGS

FIG. 1 is a block diagram of a first embodiment of a communication system including a subscriber line access multiplexer according to the present invention;

FIG. 9 is a diagram showing an example of a relationship between a configuration parameter values and ADSL performance results after setting up the parameters in the performance test with a default ADSL line configuration parameter;

FIG. 12 is a diagram showing an example of the relationship between the configuration parameter values and ADSL performance results after setting up the parameters in the ADSL performance test of fast/interleave channels;

DETAILED DESCRIPTION OF THE PREFERRED EMBODIMENTS

Figure 2A:
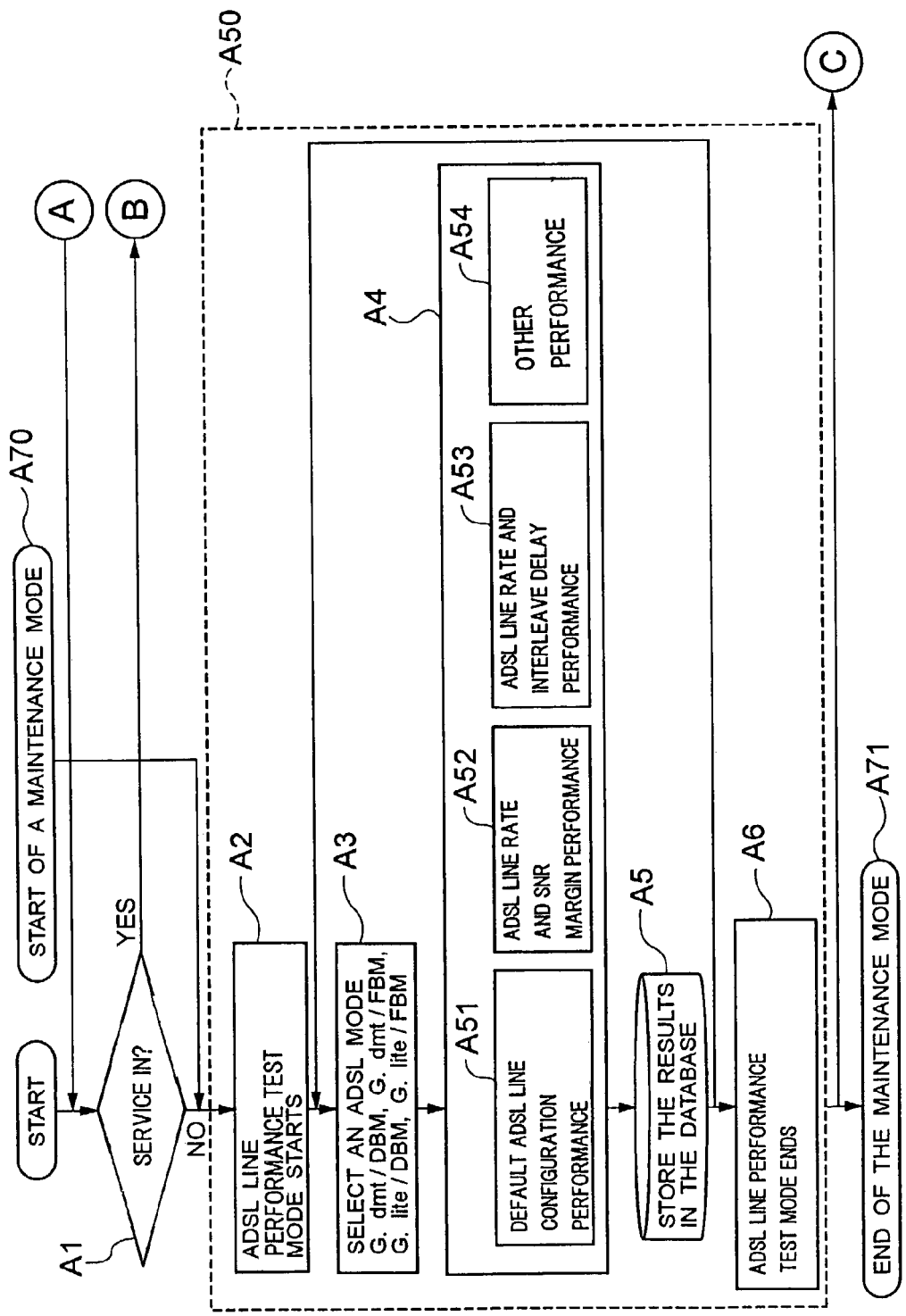
FIGS. 2A and 2B are flowcharts showing the operation of the first embodiment of the communication system including the subscriber line access multiplexer according to the present invention.

Hereafter, embodiments of the present invention will be described by referring to the attached drawings. To begin with, a first embodiment will be described. FIG. 1 is a block diagram of the first embodiment of a communication system including a subscriber line access multiplexer according to the present invention. As shown therein, the communication system according to the present invention is comprised of a DSLAM (Digital Subscriber Line Access Multiplexer) 80, a network 90, an NMS (Network Management System) 6, ATU-Rs (ADSL Termination Unit—Remote: a subscriber side ADSL modem) #1 20a to #n 20n and PCs (personal computers) #1 30a to #n 30n, where the NMS 6 and DSLAM 80 are connected via the network 90, the ATU-Rs #1 20a to #n 20n are connected to the DSLAM 80 via communication lines 50a to 50n, and the PCs #1 30a to #n 30n are connected to the ATU-Rs #1 20a to #n 20n.

The DSLAM 80 is comprised of a data signal multiplexing portion 3, ATU-C #1 10a, ATU-C #2 10b, ATU-C #n 10n (ADSL Termination Unit—Central Office: office side ADSL modem), an ADSL line performance test portion 1, a database 2 and a recording medium 4.

The network 90 to which the DSLAM 80 is connected generally has the NMS 6 which is the network management system connected thereto, and the NMS 6 mainly monitors and controls the network 90 and DSLAM 80. Furthermore, the NMS 6 controls the ADSL line performance test portion 1 in the DSLAM 80 and refers to and controls the database 2 via the network 90.

The data signal multiplexing portion 3 multiplexes the data signals received from the ATU-C #1 10a, ATU-C #2 10b and ATU-C #n 10n and sends them to the network 90. The data signal multiplexing portion 3 also sends the data signals received from the network 90 by sorting them into the ATU-C #1 10a, ATU-C #2 10b and ATU-C #n 10n.

The ADSL line performance test portion 1 sets an ADSL line configuration parameter to each of the ATU-C #1 10a, ATU-C #2 10b and ATU-C #n 10n. Furthermore, it automatically performs an ADSL line performance test by following an ADSL line performance test sequence. Furthermore, it stores ADSL line performance test results in the database 2. In addition, it refers to the ADSL line performance test results stored in the database 2 and detects an adequate ADSL line configuration parameter. Moreover, the ADSL line performance test portion 1 also has an ADSL line configuration parameter initial value.

The respective subscriber's house has the respective ATU-R #1 20a, ATU-R #2 20b and ATU-R #n 20n (ADSL Termination Unit—Remote: a subscriber side ADSL modem) and the respective PCs (personal computers) #1 30a, PC #2 30b and PC #n 30n held by the subscribers installed therein.

The respective PC #1 30a, PC #2 30b and PC #n 30n are connected to the respective ATU-R #1 20a, ATU-R #2 20b and ATU-R #n 20n.

The respective ATU-C #1 10a, ATU-C #2 10b and ATU-C #n 10n in the DSLAM 80 are connected to the respective ATU-R #1 20a, ATU-R #2 20b and ATU-R #n 20n via the respective subscriber lines 50a, 50b and 50n.

The ADSL is a technology for allowing high-rate data communication by utilizing an existing telephone line, and so the respective subscriber lines 50a, 50b and 50n to the subscriber's house are the telephone lines currently in use, which will be the ADSL lines.

The subscribers use their respective PC #1 30a, PC #2 30b and PC #n 30n to connect to the network 90 via the ATU-R #1 20a, ATU-R #2 20b and ATU-R #n 20n, the subscriber lines 50a, 50b and 50n which are now the ADSL lines capable of the high-rate data communication and the DSLAM 80 so as to perform the data communication related to the Internet.

The training among the respective ATU-C #1 10a, ATU-C #2 10b and ATU-C #n 10n and the respective ATU-R #1 20a, ATU-R #2 20b and ATU-R #n 20n is performed by referring to the ADSL line configuration parameter set up by the ADSL line performance test portion 1. As a result of the training, transmission bands of the ADSL lines of the subscriber lines 50a, 50b and 50n are determined.

Figure 2B:
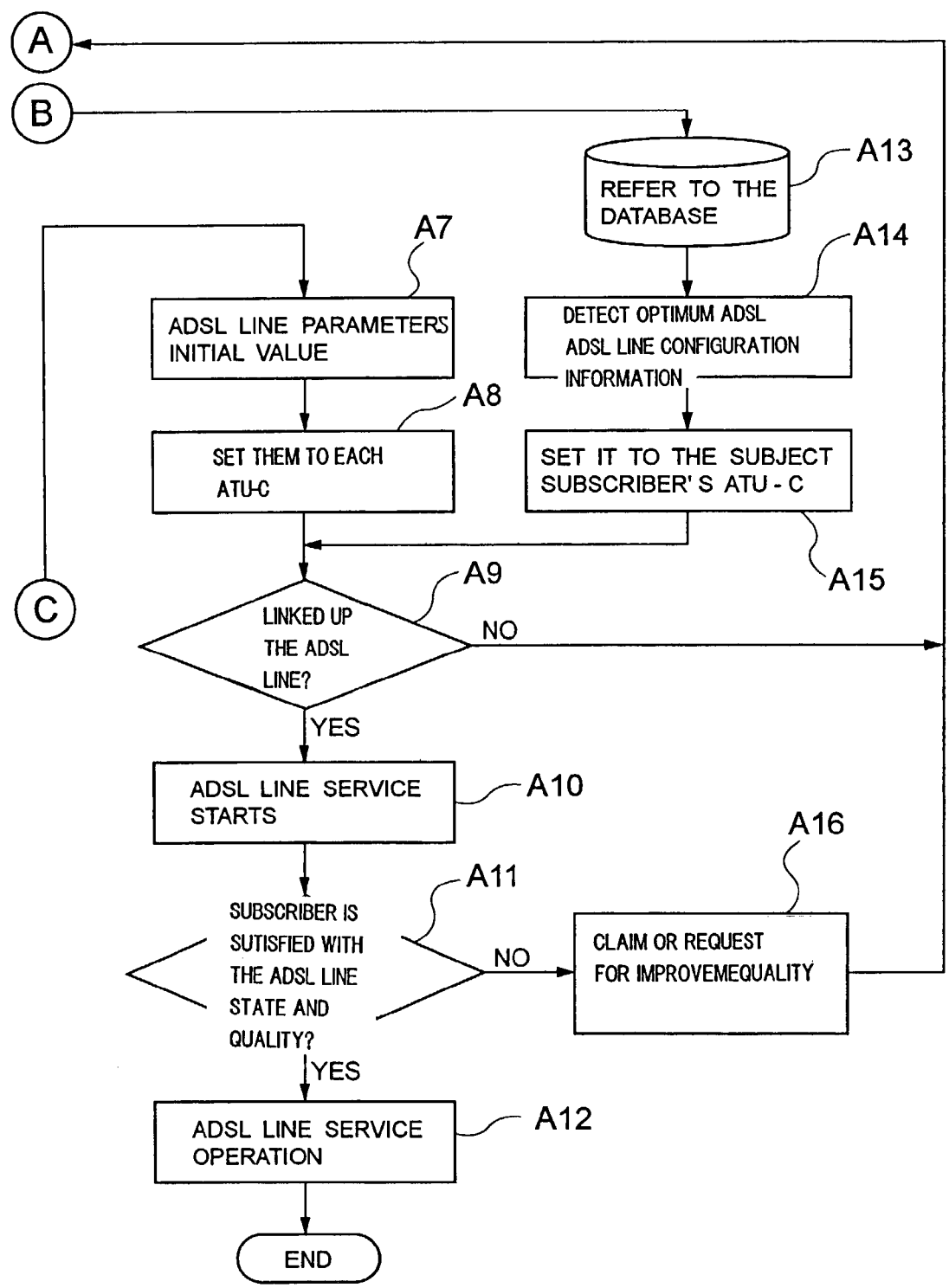

Next, operation of the first embodiment according to the present invention will be described by referring to FIGS. 2A and 2B. FIGS. 2A and 2B are flowcharts showing the operation of the first embodiment. There are two operation modes, that is, a normal mode and a maintenance mode.

In the case of the normal mode, the ADSL line performance test portion 1 of the DSLAM 80 in the communication system according to the present invention determines whether or not the subscriber lines 50a, 50b and 50n are in an operational state as the ADSL lines (step A1).

In the case where the subscriber lines 50a, 50b and 50n are in a service inoperative state as the ADSL lines (NO in the step A1), the ADSL line performance test portion 1 implements an ADSL line performance test sequence group (step A50).

If an ADSL line performance test mode starts (step A2) in the ADSL line performance test sequence group (step A50), then either of the ADSL operation modes prescribed by G. dmt and G. lite is selected (step A3).

And the ADSL line performance test portion 1 performs an ADSL line performance test to the subscriber lines by following the ADSL line performance test sequence group (step A4) preset to the ADSL operation mode selected in the step A3.

For instance, the ADSL line performance test sequence group (step A4) performs a performance test with a default ADSL line configuration parameter (step A51), an ADSL performance test of ADSL line rate and SNR (Signal to Noise Ratio) (step A52), the ADSL performance test of the ADSL line rate and interleave delay (step A53) and other ADSL performance tests (step A54).

As for the performance test with a default ADSL line configuration parameter (step A51), it is possible to grasp a state of each subscriber line which will be the ADSL line in the case of the default ADSL line configuration parameter set up by an ADSL line service provider.

FIG. 9 is a diagram showing an example of a relationship between a configuration parameter values and ADSL performance results after setting up the parameters in the performance test with the default ADSL line configuration parameter.

With reference to the diagram, a target SNR margin, a maximum SNR margin, a minimum SNR margin, a maximum ADSL line rate, a minimum ADSL line rate and a maximum interleave delay are provided as configuration parameters in up and down stream directions, and moreover, those configuration parameters are provided separately to the respective modes of G. dmt/DBM (Dual Bit Map), G. dmt/FBM (Fext Bit Map), G. lite/DBM and G. lite/FBM.

And the ADSL performance results for the configuration parameters are provided in the up stream and the down stream directions respectively as the ADSL line rate, current SNR margin and current attenuation. Moreover, those ADSL performance results are provided separately to the respective modes of G. dmt/DBM, G. dmt/FBM, G. lite/DBM and G. lite/FBM.

As for the ADSL performance test of the ADSL line rate and SNR margin (step A52), an SNR margin value to be a target is changed to increase or decrease from a default value, and the ADSL line rate at the time is recorded so as to grasp a bearing force against ambient noise and the ADSL line rate in each subscriber line which will be the ADSL line and grasp the ADSL line configuration parameter hardly allowing the ADSL line to be interrupted due to influence of the noise with an emphasis on the ADSL line rate and ADSL line strength.

Figure 10:
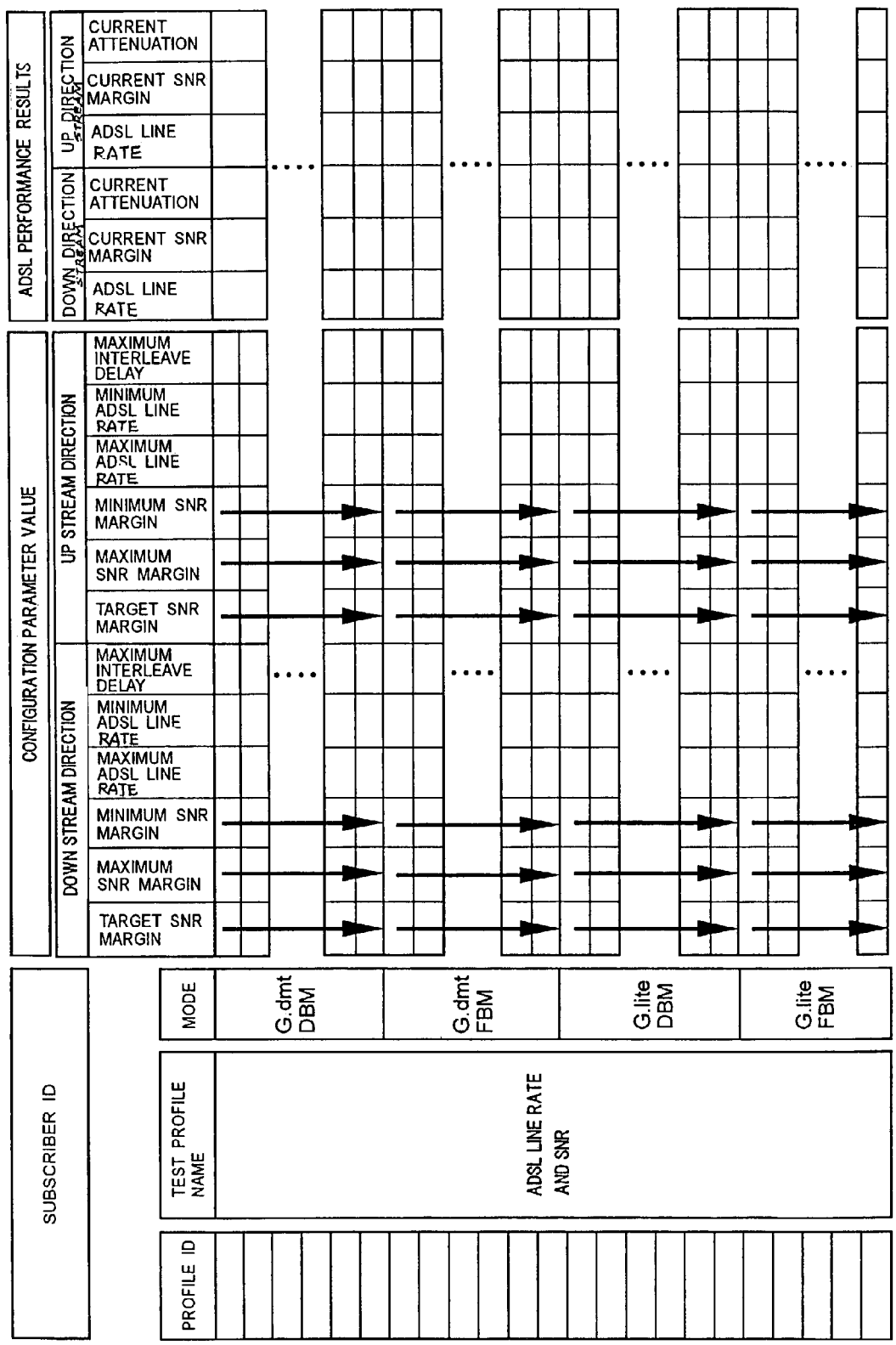
FIG. 10 is a diagram showing an example of the relationship between the configuration parameter values and ADSL performance results after setting up the parameters in the ADSL performance test of ADSL line rate and SNR margin.

FIG. 10 is a diagram showing an example of the relationship between the configuration parameter values and ADSL performance results after setting up the parameters in the ADSL performance test of the ADSL line rate and SNR margin.

In this diagram, the types of the configuration parameters and ADSL performance results are the same as those in the aforementioned FIG. 9. This diagram shows that the SNR margins are sequentially changed.

As for the ADSL performance test of the ADSL line rate and interleave delay (step A53), an interleave delay value is changed to increase or decrease from the default value, and the ADSL line rate at the time is recorded so as to grasp the ADSL line configuration parameter with an emphasis on the ADSL line rate and reliability of the data signal flowing on the ADSL line.

Figure 11:
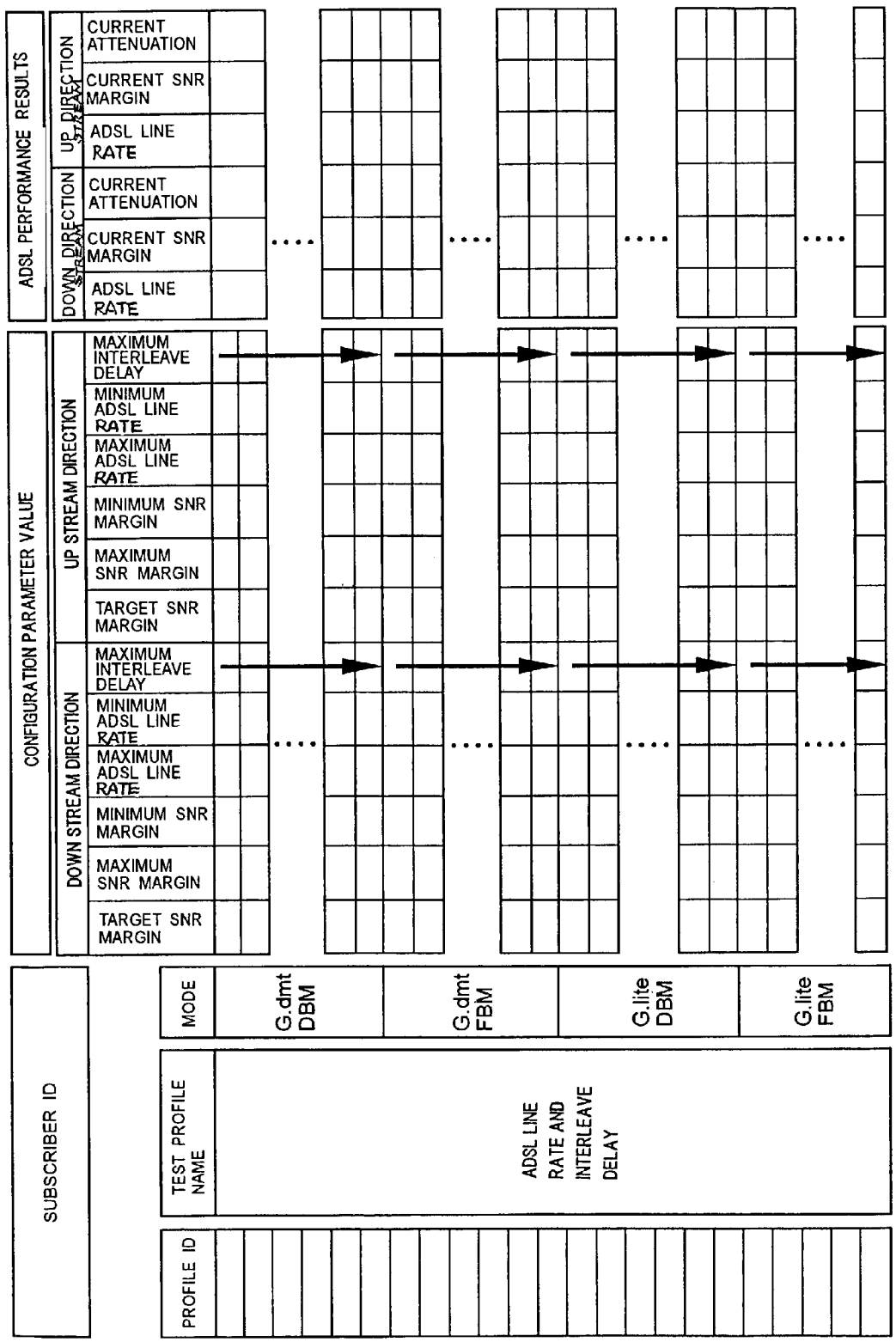
FIG. 11 is a diagram showing an example of the relationship between the configuration parameter values and ADSL performance results after setting up the parameters in the ADSL performance test of the ADSL line rate and interleave delay.
Figure 13:
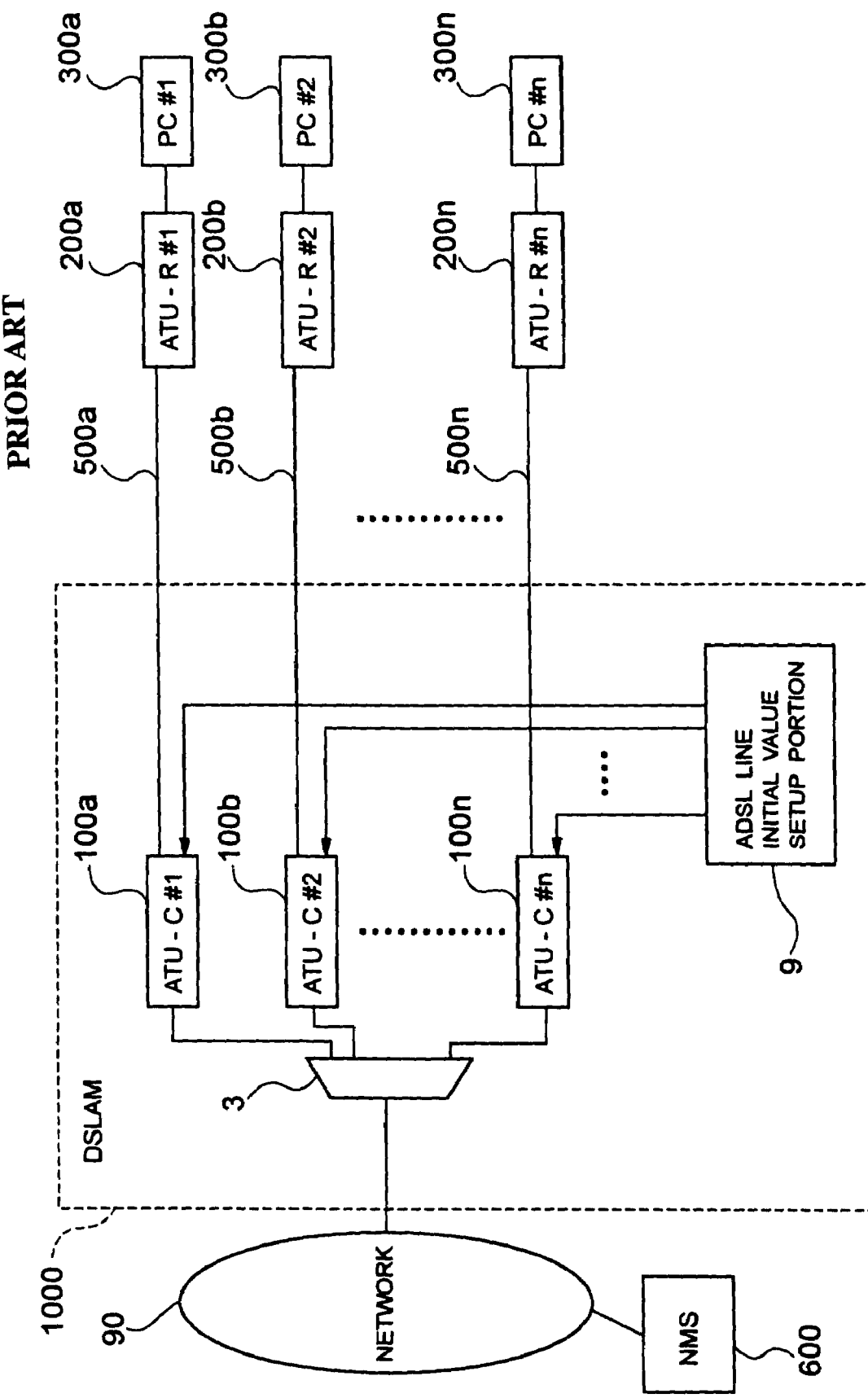
FIG. 13 is a block diagram of a DSLAM (Digital Subscriber Line Access Multiplexer) in the past.
Figure 14:
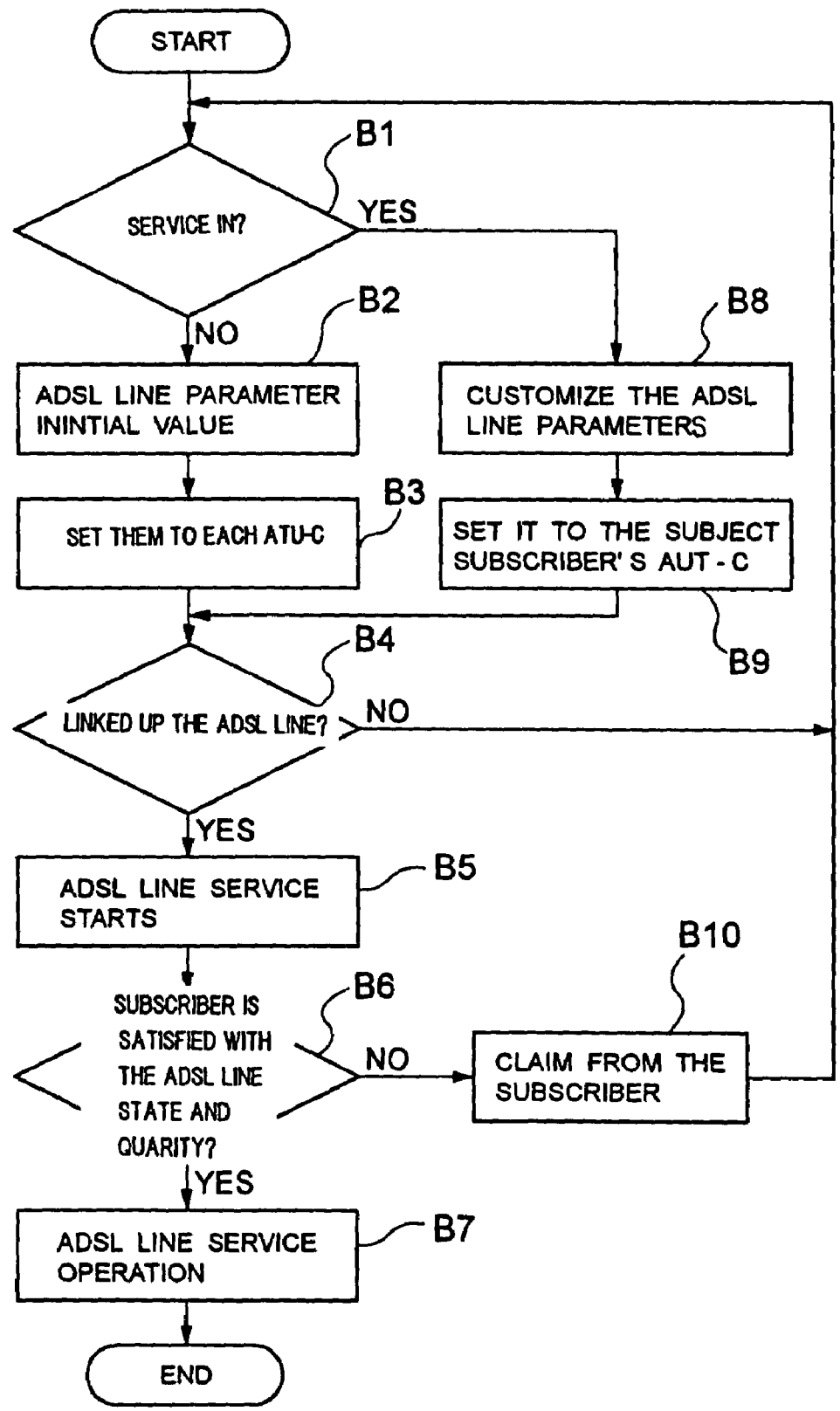
FIG. 14 is a flowchart showing operation of ADSL line setup of the DSLAM in the past (1000 in FIG. 13).

FIG. 11 is a diagram showing an example of the relationship between the configuration parameter values and ADSL performance results after setting up the parameters in the ADSL performance test of the ADSL line rate and interleave delay.

In this diagram, the types of the configuration parameters and ADSL performance results are the same as those in the aforementioned FIG. 9. This diagram shows that the maximum interleave delays are sequentially changed.

As other examples of the ADSL performance test (step A54), there is a performance test of the ADSL line types and the respective parameters. The ADSL line types are, that is, a fast channel and interleave channel. There are the fast channel and interleave channel in the ADSL specifications. The difference between them is whether or not to consider a delay of the signal flowing on the ADSL line. In the case of the fast channel, the interleave delay becomes 0 (ms). If the interleave delay is 0 (ms), it means not to scramble the signal. Therefore, there may be the cases where, if an error occurs to the signal, it does not hold as data.

In the case of the interleave channel, the interleave delay is an arbitrary value (ms). However, there are upper and lower limits. Therefore, there is time for scrambling the signal (buffer) so that it is possible, in the case where an error occurs to the signal, to correct the error portion and link up it as the data.

FIG. 12 is a diagram showing an example of the relationship between the configuration parameter values and ADSL performance results after setting up the parameters in the ADSL performance test of the fast/interleave channels.

In this diagram, the types of the configuration parameters and ADSL performance results are the same as those in the aforementioned FIG. 9. This diagram shows that the configuration parameters are provided to each of the fast channel and interleave channel.

In the ADSL line performance test sequence group (step A4), the ADSL line performance test portion 1 sets the ADSL line configuration parameter to the ATU-C (any one of 10*a*, 10*b* and 10*n*) which is to be tested. The ATU-C (any one of 10*a*, 10*b* and 10*n*) to which the ADSL line configuration parameter is set performs the training with a connected ATU-R (any one of 20*a*, 20*b* and 20*n*).

As a result of this training, the subscriber line (any one of 50*a*, 50*b* and 50*n*) is put in the state of the ADSL line connected, and the ADSL line performance test portion 1 obtains ADSL line performance result information from the ATU-C (any one of 10*a*, 10*b* and 10*n*).

Next, the ADSL line performance test portion 1 stores the ADSL performance test results in the database (2 in FIG. 1) in the ADSL line performance test sequence group (step A4) (step A5).

The ADSL performance test in the selected ADSL operation mode is finished as above. To perform the same performance test in another ADSL operation mode, the ADSL line performance test portion 1 selects another ADSL operation mode in the step A3, performs the ADSL line performance test sequence group (step A4), stores the test results in the database 2 (step A5), and then repeats steps A3 to A5.

If the performance tests in all the ADSL operation modes are finished, the ADSL line performance test portion 1 finishes the test mode (step A6). The above operation finishes the ADSL line performance test mode before the ADSL line service operation.

Next, the ADSL line performance test portion 1 of the DSLAM 80 prepares the ADSL line configuration parameter initial value (step A7).

The ADSL line performance test portion 1 sets the ADSL line configuration parameter initial value to each of the ATU-C #1 10*a*, ATU-C #2 10*b*, ATU-C #n 10*n* (step A8).

Each of the ATU-Cs (10*a*, 10*b* and 10*n*) refers to the ADSL line configuration parameter set up in the step A8, and performs the training in compliance with G. dmt or G. lite with each of the ATU-Rs (20*a*, 20*b* and 20*n*) so as to link up the ADSL line as a result of the training (YES in the step A9). The service allowing the high-rate data communication is provided by the linked up ADSL line (step A10). In the case where the subscriber is satisfied with the ADSL line state and quality (YES in the step A11), then the ADSL lines will be in the service operation state (step A12).

However, there are the cases where the ADSL lines are not linked up with the ADSL line configuration parameter initial value in the step A7 (NO in the step A9) and the cases where the subscriber may be dissatisfied such as synchronization of the ADSL lines sometimes being cut and the data communication being interrupted due to the state of the ADSL lines, that is, the rate of the acquired bands and the influence of a noise source halfway on the line to the subscriber's house (NO in the step A11).

In such cases, the subscriber files a claim or request for improvement in ADSL line state and quality to the ADSL line service provider (step A16).

The ADSL line service provider determines that the ADSL lines are in the state of starting the operation (YES in the step A1).

The ADSL line service provider refers to the ADSL line performance test results of the ADSL line performance test sequence group (step A4) of the ADSL line performance test portion 1 from the database 2 via the ADSL line performance test portion 1. Or the ADSL line performance test portion 1 refers to the database 2 in order to search for an optimum value as the ADSL line configuration parameter (step A13).

The ADSL line configuration parameter optimum value is detected from the database 2 (step A14).

The claims from the subscriber are as follows, for instance. The ADSL line rate is slow, the ADSL line rate is sufficient but there are often errors in the data, resending of the data occurs, synchronization of the ADSL lines is cut and the data cannot be transmitted, or the ADSL lines are not in synchronization and so on.

As for these claims, a reference is made to the performance results of the ADSL performance test of the ADSL line rate and SNR margin tested in the step A52 and the ADSL performance test of the ADSL line rate and interleave delay tested in the step A53 so as to make a comparison with the performance test results with the default ADSL line configuration parameter in the step A51.

As a matter of course, each of the ATU-Cs (10*a*, 10*b* and 10*n*) has an alarm monitoring function of the state of the ADSL lines, error count and so on. The alarm monitoring function can be referred to from the NMS 6, and the state of the lines is thereby managed.

Thus, the ADSL line service provider can extract the ADSL line configuration parameter capable of solving the claims by comprehensively assessing the ADSL line state and quality from the NMS 6, ADSL line performance test results and claims from the subscriber.

The ADSL line performance test portion 1 sets the detected ADSL line configuration parameter optimum value to the ATU-C to which the subscriber line of the subject subscriber is connected (step A15).

The training is performed again (YES in the step A9, and A10). And in the case where the subscriber is satisfied with the ADSL line state and quality (YES in the step A11), then the ADSL lines will be in the service operation state (step A12).

Furthermore, to grasp the state of the subscriber line, the ADSL line service provider can operate the ADSL line performance test portion 1 in the maintenance mode (step A70).

The maintenance mode starts the ADSL line performance test whether or not the ADSL line service is in the operation state (step A70). In general, in the case where the maintenance is necessary, the ADSL line service provider usually gives notice in advance that the maintenance will be performed.

In this case, the ADSL line performance test sequence group (step A50) is implemented so as to finish the maintenance mode of the ADSL line performance test (step A71).

It is possible, by implementing the maintenance mode (step A70, step A50 and step A71), to update the ADSL line performance result data of each subscriber line.

Thus, it is possible, in the case where the claim from the subscriber arises, to provide the optimum ADSL line configuration parameter by referring to the current ADSL line performance result data.

Figure 3:
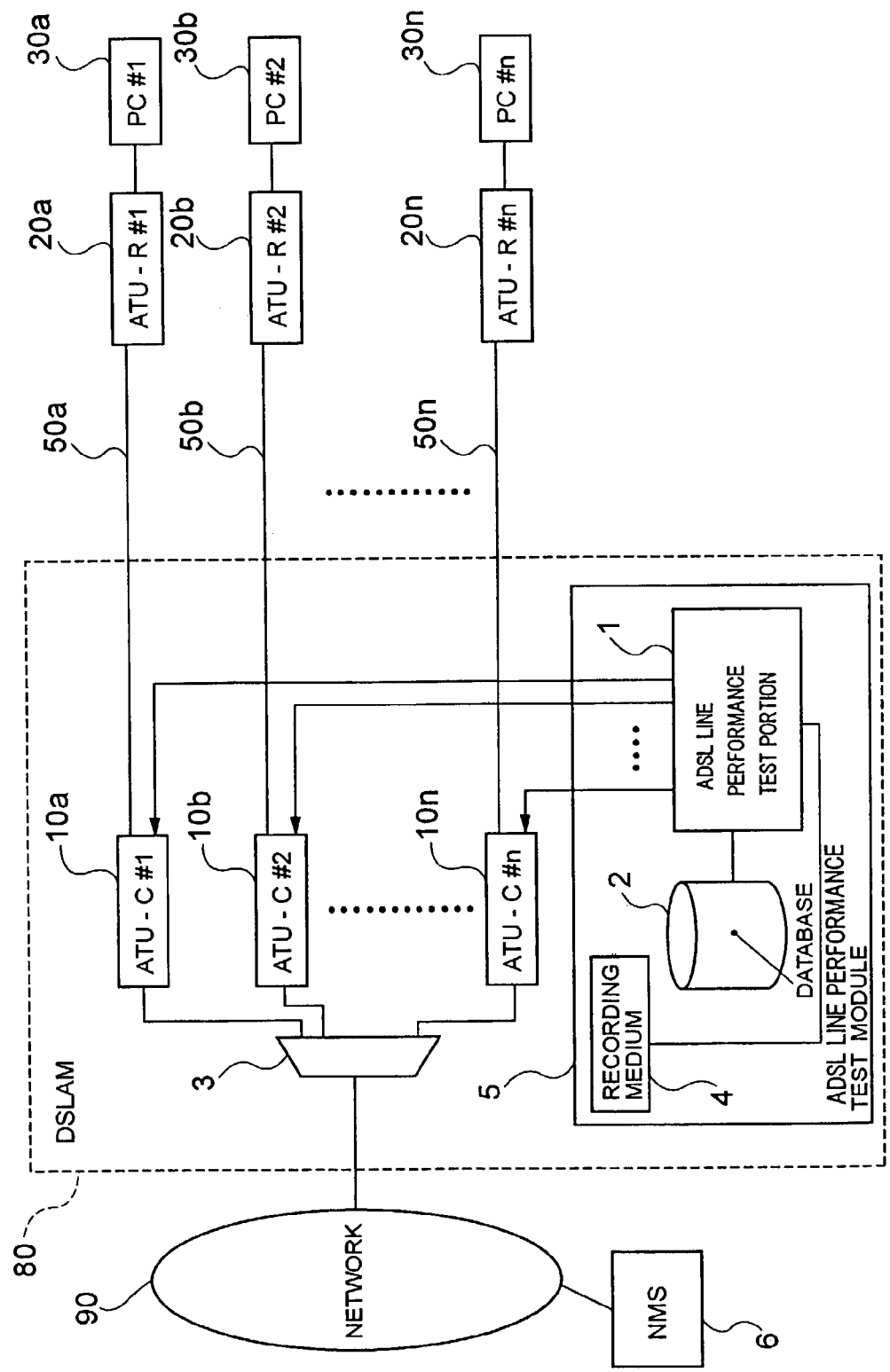
FIG. 3 is a block diagram of a second embodiment.

Next, a second embodiment will be described in detail by referring to the drawings. FIG. 3 is a block diagram of the second embodiment. With reference to this diagram, the second embodiment according to the present invention is different from the first embodiment in that the ADSL line performance test portion 1, database 2 and recording medium 4 are placed as an ADSL line performance test module 5 in the DSLAM 80.

Therefore, in the case where the ADSL line performance test module 5 is mounted on the DSLAM 80, it is possible for the DSLAM 80 to perform the ADSL line performance test.

The ADSL line performance test portion 1 having the ADSL line performance test function is controlled by the NMS 6 as to the entire ADSL line performance test module 5.

To be more specific, it is possible to select whether or not the ADSL line performance test function is necessary for the DSLAM 80.

Next, the operation of the second embodiment will be described. Here, the ADSL line performance test portion 1 and database 2 are placed as the ADSL line performance test module 5 in the DSLAM 80, where their operation is the same as that of the first embodiment.

The ADSL line performance test module 5 performs the same processing as that of the first embodiment in FIG. 2. In the case where the ADSL line performance test module 5 is mounted, the DSLAM 80 is capable of the operation shown in FIG. 2. Nevertheless, it cannot implement the operation shown in FIG. 2 in the case where the ADSL line performance test module 5 is not mounted on the DSLAM 80.

As the ADSL line performance test portion 1 and database 2 are placed as the ADSL line performance test module 5, the DSLAM 80 is given extensibility.

Figure 4:
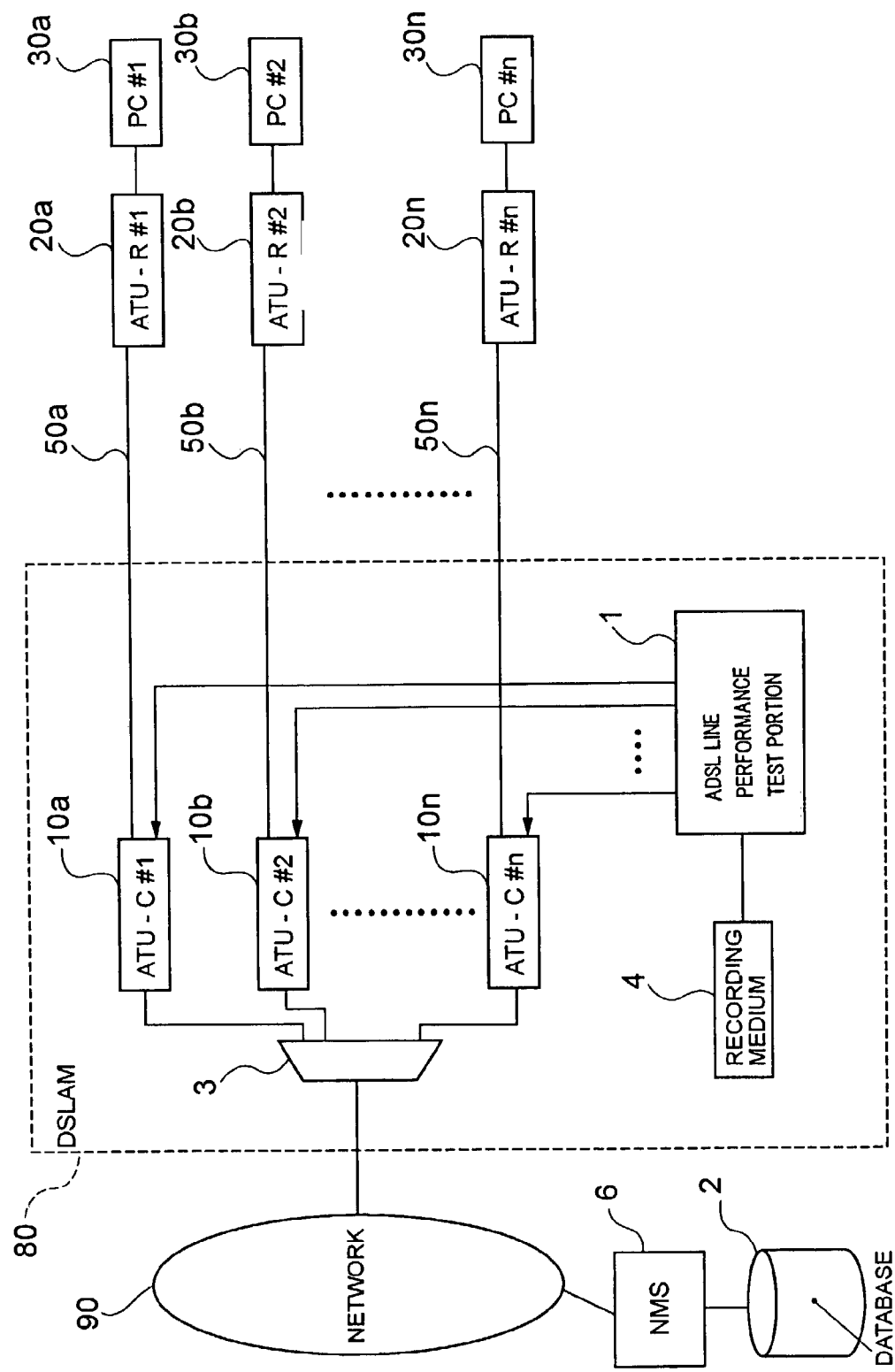
FIG. 4 is a block diagram of a third embodiment.

Next, a third embodiment will be described in detail by referring to FIG. 4. FIG. 4 is a block diagram of the third embodiment. With reference to this diagram, the third embodiment according to the present invention is different from the first embodiment in that the database 2 for storing the ADSL line performance test result data is connected to the NMS 6.

Therefore, the ADSL line performance test result data implemented by the ADSL line performance test portion 1 of the DSLAM 80 is stored in the database 2 of the NMS 6 via the network 90.

Next, the operation of the third embodiment will be described. While the operation of the third embodiment is the same as that of the first embodiment, the ADSL line performance test portion 1 placed in the DSLAM 80 stores the test result data of the ADSL line performance test sequence group (step A4 in FIG. 2) in the database 2 managed by the NMS 6.

The ADSL line performance test portion 1 refers to the database 2 managed by the NMS 6. The maintainability as to the data is improved by connecting the database 2 to the NMS 6.

Figure 5:
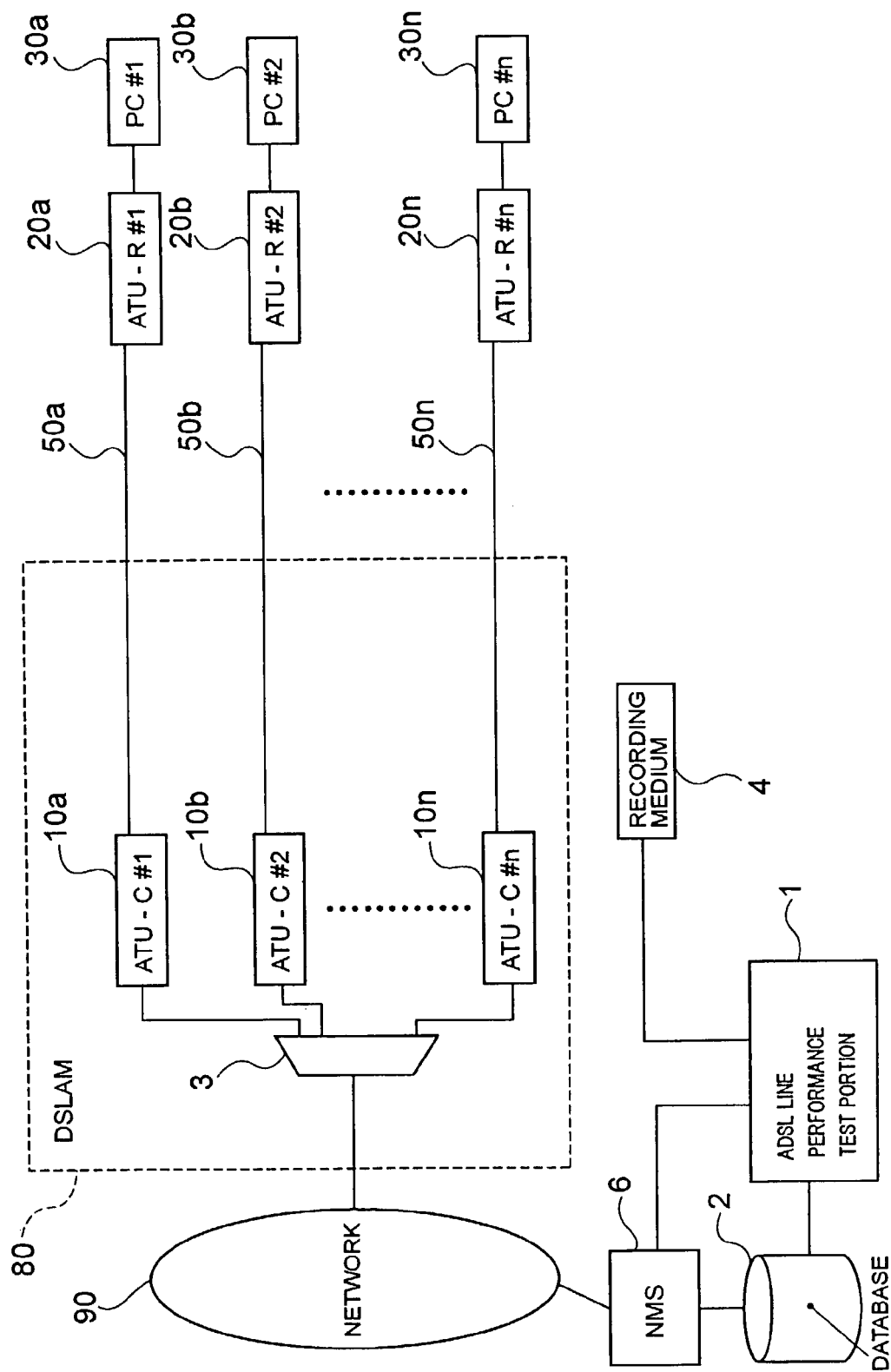
FIG. 5 is a block diagram of a fourth embodiment.

Next, a fourth embodiment will be described in detail by referring to FIG. 5. FIG. 5 is a block diagram of the fourth embodiment. With reference to this diagram, the fourth embodiment according to the present invention is different from the first embodiment in that the ADSL line performance test portion 1 and the database 2 for storing the ADSL line performance test result data are connected to the NMS 6.

The ADSL line performance test portion 1 is realized by a control terminal and so on different from the NMS, and operates in collaboration with the NMS 6 or accesses the DSLAM 80 via the NMS 6 so as to perform the ADSL line performance test by controlling the ATU-C #1 10a, ATU-C #2 10b and ATU-C #n 10n.

Therefore, in the case of performing the ADSL line performance test, the test is implemented and controlled by the ADSL line performance test portion 1 connected to the NMS 6 for monitoring the DSLAM 80.

Figure 6:
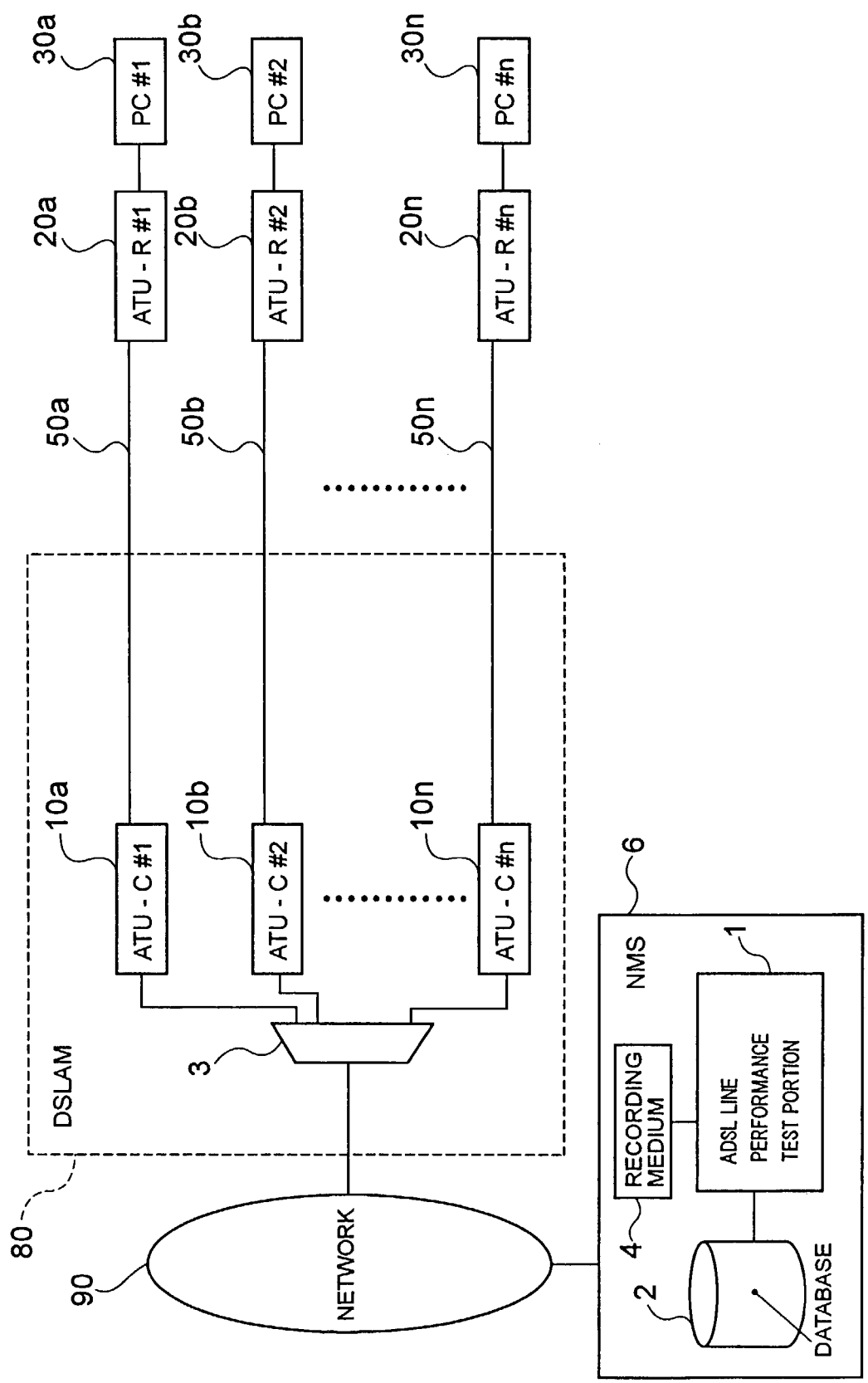
FIG. 6 is a block diagram of a fifth embodiment.

Next, a fifth embodiment will be described in detail by referring to FIG. 6. FIG. 6 is a block diagram of the fifth embodiment. With reference to this diagram, the fifth embodiment according to the present invention is different from the first embodiment in that the ADSL line performance test portion 1, the database 2 for storing the ADSL line performance test result data and the recording medium 4 are included in the NMS 6.

Therefore, in the case of performing the ADSL line performance test, the test is controlled from the NMS 6 for monitoring the DSLAM 80. Furthermore, the performance test result data is stored in the database 2 placed on the NMS 6.

The operation of the fourth and fifth embodiments is the same as that of the first embodiment, and so a description thereof will be omitted.

Figure 7:
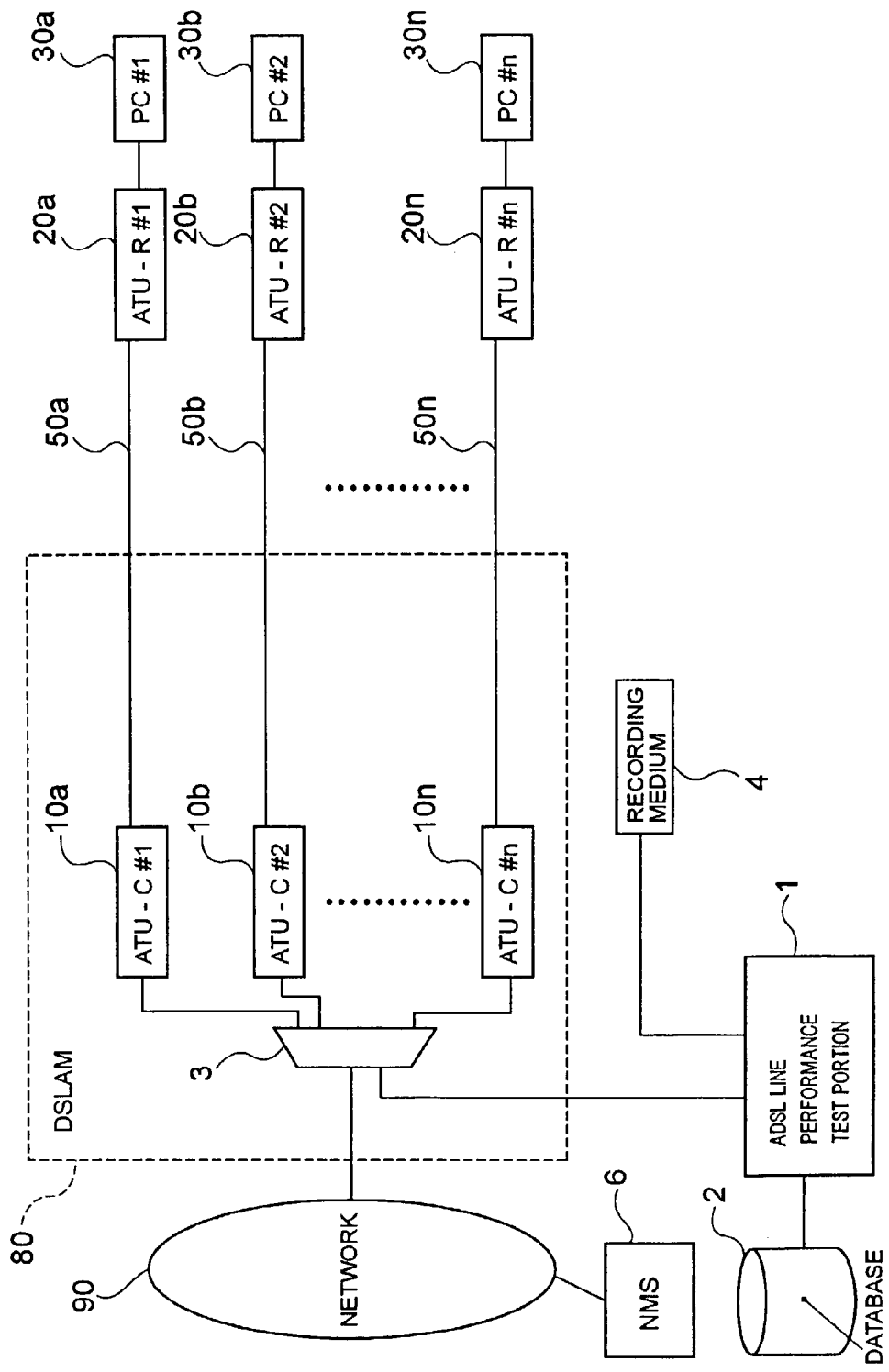
FIG. 7 is a block diagram of a sixth embodiment.

Next, a sixth embodiment will be described in detail by referring to FIG. 7. FIG. 7 is a block diagram of the sixth embodiment. The sixth embodiment is a transformed embodiment of the aforementioned fourth embodiment (refer to FIG. 5). In the fourth embodiment, the ADSL line performance test portion 1 is connected to the DSLAM 80 via the network 90 so as to perform the ADSL line performance test. As opposed to this, in the sixth embodiment, the ADSL line performance test portion 1 is directly connected to the DSLAM 80 so as to perform the ADSL line performance test. Otherwise, it is the same as the fourth embodiment.

Figure 8:
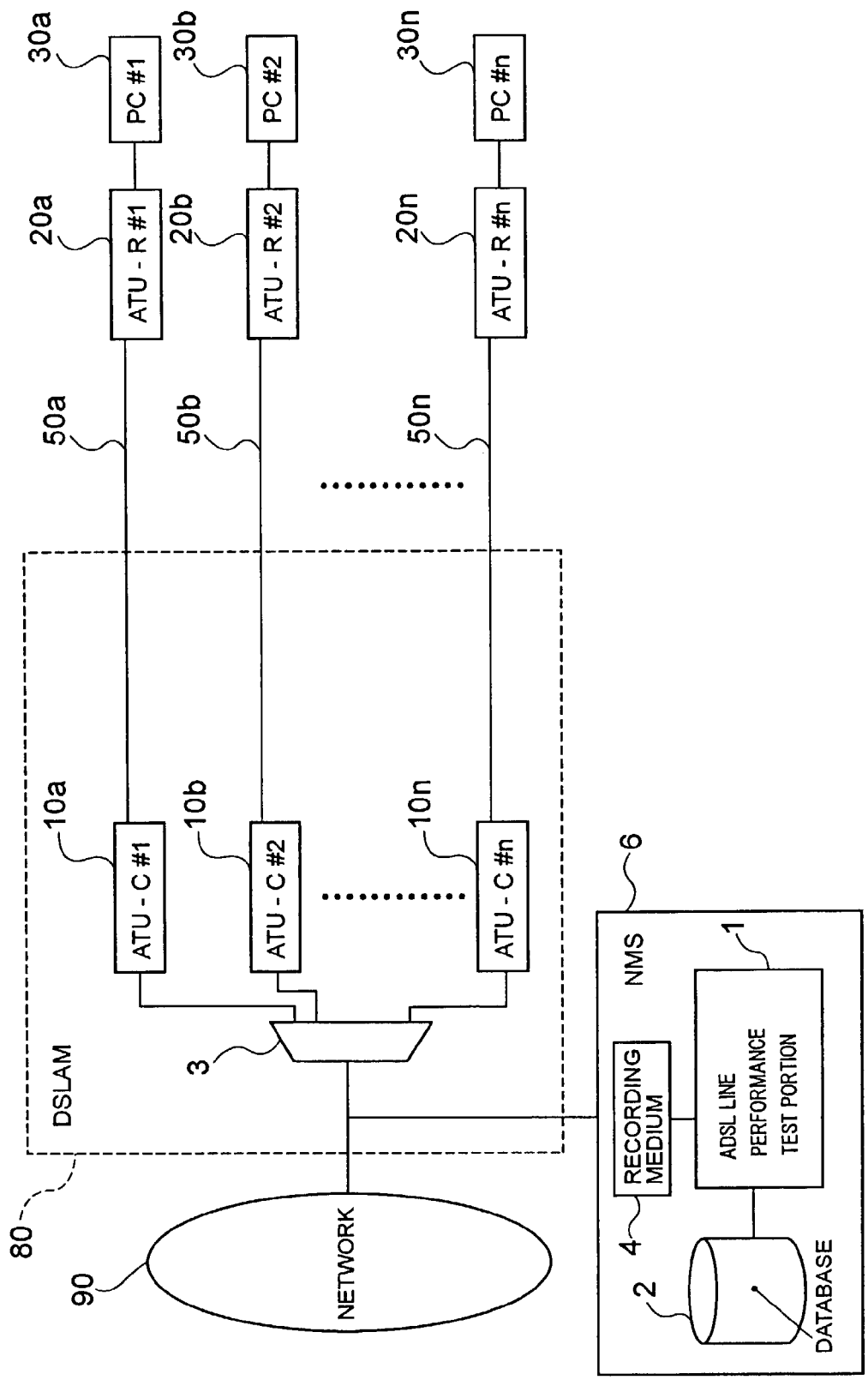
FIG. 8 is a block diagram of a seventh embodiment.

Next, a seventh embodiment will be described in detail by referring to FIG. 8. FIG. 8 is a block diagram of the seventh embodiment. The seventh embodiment is a transformed embodiment of the aforementioned fifth embodiment (refer to FIG. 6). In the fifth embodiment, the NMS 6 is connected to the network 90. Therefore, the NMS 6 controls the DSLAM 80 via the network 90. As opposed to this, in the seventh embodiment, the NMS 6 is directly connected to the data signal multiplexing portion 3 in the DSLAM 80, and so the NMS 6 directly controls the data signal multiplexing portion 3. Otherwise, it is the same as the fifth embodiment.

Next, an eighth embodiment will be described. The eighth embodiment relates to a program for causing a computer to execute the ADSL line performance test method. The ADSL line performance test portion 1 of the first to seventh embodiments has the recording medium 4 connected thereto (refer to FIGS. 1, 3 to 8). The recording medium 4 has the program shown by the flowchart in FIG. 2 stored therein. The ADSL line performance test portion 1 reads the program from the recording medium 4, and controls the ATU-C #1 10a to ATU-C #n 10n according to the flowchart in FIG. 2.

As the communication system according to the present invention includes performance test means for testing the performances of the subscriber line and setting the line configuration parameter to the above described subscriber line based on the above described test results, it is possible to provide an optimum ADSL line configuration parameter for each subscriber line and improve performance quality of the ADSL line.

The subscriber line access multiplexer, the line performance test method and the program according to the present invention also have the same effects as the communication system.

To be more specific, a first effect of the present invention is that the ADSL line service provider can easily prepare the ADSL line configuration parameter for implementing an optimum ADSL line state and quality on each subscriber line and improve the quality of the ADSL line to be provided.

It is because the DSLAM has the ADSL line performance test portion for automatically performing the ADSL line performance test on the subscriber line. Or it is because the NMS has the ADSL line performance test portion for automatically performing the ADSL line performance test. And it is because the ADSL line performance test portion is provided as a separate terminal.

Furthermore, it is because the DSLAM or the NMS has the database and is able to store in the database the test results implemented by the ADSL line performance test portion to refer to it later.

Furthermore, it is because the ADSL line performance test portion implements the performance test on the ADSL line before the ADSL line service operation so as to grasp the line state of each subscriber line which will be the ADSL line.

A second effect is that the ADSL line service provider can promptly handle the claim about the ADSL line service from each subscriber so as to improve the maintainability and customer satisfaction.

It is because the ADSL line service provider has ADSL line performance data of the implemented tests in the database in advance, which can be referred to at any time. Furthermore, it is because the ADSL line performance test portion can operate in the maintenance mode so that, even in the state of the ADSL line service operation, it can obtain performance information on the ADSL line and constantly have a current optimum ADSL line configuration parameter as required.

A third effect is that that the ADSL line service provider can handle the claim about the ADSL line service from each subscriber at minimum cost.

It is because the ADSL line performance test portion automatically tests the ADSL line performances as to each subscriber line. Furthermore, it is because it can refer to the ADSL line performance result data of the automatically implemented tests.

What is claimed is:

1. A communication system comprising:
   a performance test means for testing a performance of a subscriber line, obtaining test results as a result thereof, and setting a line configuration parameter to said subscriber line based on said test results;
   a database for storing the test results by said performance test means; and
   a subscriber line access multiplexer, a network management system, a network to which said subscriber line access multiplexer and said network management system are connected, and a subscriber line to be connected to said subscriber line access multiplexer,
   wherein said performance test means and said database are directly connected to said network management system and are not included as elements of said subscriber line access multiplexer, and
   wherein said database is external to and not a component of said performance test means.

2. The communication system according to claim 1, wherein said performance test means tests the performance of said subscriber line by having a predetermined line configuration parameter changed.

3. The communication system according to claim 1, wherein said performance test means sets a line configuration parameter by referring to the test results stored in said database.

4. The communication system according to claim 1, wherein said performance test means performs a performance test of said subscriber line either before or during line service operation, or before and during the line service operation.

5. The communication system according to claim 1, wherein said database and said performance test means are detachably provided.

6. A communication system comprising:
   a performance test means for testing a performance of a subscriber line, obtaining test results as a result thereof, and setting a line configuration parameter to said subscriber line based on said test results;
   a database for storing the test results by said performance test means; and
   a subscriber line access multiplexer, a network management system, a network to which said subscriber line access multiplexer and said network management system are connected, and a subscriber line to be connected to said subscriber line access multiplexer,
   wherein said database is connected to said performance test means and not directly connected to said subscriber line access multiplexer, and said performance test means is directly connected to said subscriber line access multiplexer and thereby communicatively provided between said subscriber line access multiplexer and said database, and
   wherein said database is external to and not a component of said performance test means.

7. A line performance test method for a network system, comprising:
   a performance test step of testing, by a performance test device, a performance of a subscriber line and obtaining test results as a result thereof;
   a line configuration parameter setting step of setting a line configuration parameter to said subscriber line based on said test results; and storing, in a database, the test results by said performance test step;

wherein the network system includes a subscriber line access multiplexer, a network management system, a network to which said subscriber line access multiplexer and said network management system are connected, and a subscriber line to be connected to said subscriber line access multiplexer, wherein said performance test device and said database are directly connected to said network management system and are not included as elements of said subscriber line access multiplexer, and wherein said database is external to and not a component of said performance test device.

8. The line performance test method according to claim 7, wherein said performance test step tests the performance of said subscriber line by having a predetermined line configuration parameter changed.

9. The line performance test method according to claim 7, wherein said performance test step sets a line configuration parameter by referring to the test results stored in said database.

10. The line performance test method according to claim 7, wherein said performance test step performs a performance test of said subscriber line either before or during line service operation, or before and during the line service operation.

11. A computer readable medium encoded with a computer program for causing a computer to execute a line performance test method recorded thereon, the line performance test method being performed for a network system, wherein a program including a performance test step of testing, by a performance test device, a performance of a subscriber line and obtaining test results as a result thereof; and a line configuration parameter setting step of setting a line configuration parameter to said subscriber line based on said test results, storing, in a database, the test results by said performance test step;

wherein the network system includes a subscriber line access multiplexer, a network management system, a network to which said subscriber line access multiplexer and said network management system are connected, and a subscriber line to be connected to said subscriber line access multiplexer, wherein said performance test device and said database are directly connected to said network management system and are not included as elements of said subscriber line access multiplexer, and wherein said database is external to and not a component of said performance test device.

12. The computer readable medium according to claim 11, wherein said performance test step tests the performance of said subscriber line by having a predetermined line configuration parameter changed.

13. The computer readable medium according to claim 11, wherein said line configuration parameter setting step sets a line configuration parameter by referring to the test results stored in said database.

14. The computer readable medium according to claim 11, wherein said performance test step performs a performance test of said subscriber line either before or during line service operation, or before and during the line service operation.

* * * * *